(12) United States Patent
Hsu

(10) Patent No.: US 8,056,575 B2
(45) Date of Patent: Nov. 15, 2011

(54) CHECK VALVE STRUCTURE FOR USE IN PUMP OF HYDRAULIC CYLINDER

(76) Inventor: Kun-Shan Hsu, Chiayi (TW)

( * ) Notice: Subject to any disclaimer, the term of this patent is extended or adjusted under 35 U.S.C. 154(b) by 893 days.

(21) Appl. No.: 11/830,481

(22) Filed: Jul. 30, 2007

(65) Prior Publication Data

US 2009/0032122 A1 Feb. 5, 2009

(51) Int. Cl.
*F16K 17/196* (2006.01)
(52) U.S. Cl. .................. 137/107; 137/538
(58) Field of Classification Search .......... 137/102, 137/107, 538
See application file for complete search history.

(56) References Cited

U.S. PATENT DOCUMENTS

| | | | | |
|---|---|---|---|---|
| 2,252,418 A | * | 8/1941 | Shelley | 137/102 |
| 2,270,549 A | * | 1/1942 | Orr | 137/102 |
| 2,610,859 A | * | 9/1952 | Wilcox et al. | 137/102 |
| 2,816,563 A | * | 12/1957 | Pappas | 137/102 |
| 3,246,663 A | * | 4/1966 | Jakowchuk | 137/102 |
| 3,314,440 A | * | 4/1967 | Horowitz | 137/226 |
| 3,464,321 A | * | 9/1969 | Piotrowski, Jr. | 91/442 |
| 3,818,929 A | * | 6/1974 | Braukmann | 137/218 |
| 4,041,970 A | * | 8/1977 | Peters | 137/102 |
| 6,079,519 A | * | 6/2000 | Lottes | 184/105.1 |

* cited by examiner

*Primary Examiner* — Stephen M Hepperle
*Assistant Examiner* — William McCalister
(74) *Attorney, Agent, or Firm* — Alan Kamrath; Kamrath & Associates PA

(57) ABSTRACT

A check valve for use in a pump of a hydraulic cylinder includes a tubular member having a sheath member received therein. The pump includes a chamber provided in an output pipe thereof for receiving the check valve. The tubular member is constructed in the form of a hollow cylinder and includes a sealing sleeve fitted therearound. The tubular member includes an oil seal mounted on the front end thereof for the engagement with a hollow screw element in the chamber. The sheath member includes a hollow cap member, a first spring element, a ball, a hollow disc element, and a second spring element which are placed into the tubular member in turn. By using the hollow disc element and the second spring element, the tubular member may be fixed in the chamber, and by way of the screw element, the tubular member is enclosed in the chamber.

3 Claims, 9 Drawing Sheets

CHECK VALVE STRUCTURE FOR USE IN PUMP OF HYDRAULIC CYLINDER

BACKGROUND OF THE INVENTION

1. Field of the Invention

The present invention relates to a check valve and, more particularly, to a check valve for use in a pump of a hydraulic cylinder that may prevent the hydraulic oil from leakage during the accelerated operation of the jack.

2. Description of the Prior Arts

The cylinder is an indispensable component provided in jacks due to its high bearing capacity, thus lifting objects easily. However, the conventional cylinder had some disadvantages, such as poor operating stability, slow raising speed and the like. To overcome such defects, an improved cylinder provided with an air operated pump therein had been developed and applied in the related field.

Such an improved air-operated pump utilizes an inputted air pressure to actuate a piston (including a spring element disposed therein and designed in an air venting and a position returning manner). A stem member of the piston is in communication with an oil route of the cylinder so as to cause a pump effect. Thus, the cylinder may generate larger fluid pressure during the operation of the air operated pump for enhancing the operating speed. Thereby, the lifting speed of the jack may be improved. However, such a lifting speed still can be accelerated.

The present invention has arisen to mitigate and/or obviate the afore-described disadvantages.

SUMMARY OF THE INVENTION

The primary object of the present invention is to provide a check valve for use in a pump of a hydraulic cylinder that may prevent the hydraulic oil from leakage during the accelerated operation of the jack.

Another object of the present invention is to provide a check valve for use in a pump of a hydraulic cylinder and including the sealing sleeve replaced by the ring element, thus saving the production cost.

In accordance with one aspect of the present invention, there is provided a check valve for use in a pump of a hydraulic cylinder comprising a check valve including a tubular member disposed therein and having a sheath member received therein. The pump includes a chamber provided in an output pipe thereof for receiving the check valve.

The tubular member is constructed in the form of a hollow cylinder and includes a sealing sleeve fitted therearound. The tubular member includes an oil seal mounted on the front end thereof for engagement with a hollow screw element in the chamber.

The sheath member includes a hollow cap member, a first spring element, a ball, a hollow disc element and a second spring element.

The hollow cap member, the first spring element, the ball and the disc element are placed into the tubular member in turn. By using the disc element and the second spring element, the tubular member may be fixed in the chamber. Thereafter, by way of the screw element, the tubular member is enclosed in the chamber. The front end of the tubular member is matingly engaged with the screw element by using the resilience of the second spring element through the disc element. The sealing sleeve corresponds to an air opening of the chamber, and the ball abuts against the disc element by the first spring element for achieving a checking purpose. The pump may generate air pressure to push the ball away and input the pressure into a cylinder. After the air pressure in the cylinder of a jack is released, the tubular member is pushed to press against the second spring element, so that the tubular member disengages from the air opening. Then, the air pressure vents from the air opening for a quick pressure releasing purpose. Thereafter, the second spring element biases the tubular member to return its initial position such that the air opening may be sealed once more, thus preventing the hydraulic oil from leakage during the accelerated operation of the jack.

The present invention will become more obvious from the following description when taken in connection with the accompanying drawings, which show, for purpose of illustration only, the preferred embodiment in accordance with the present invention.

DETAILED DESCRIPTION OF THE PREFERRED EMBODIMENT

Figure 1:
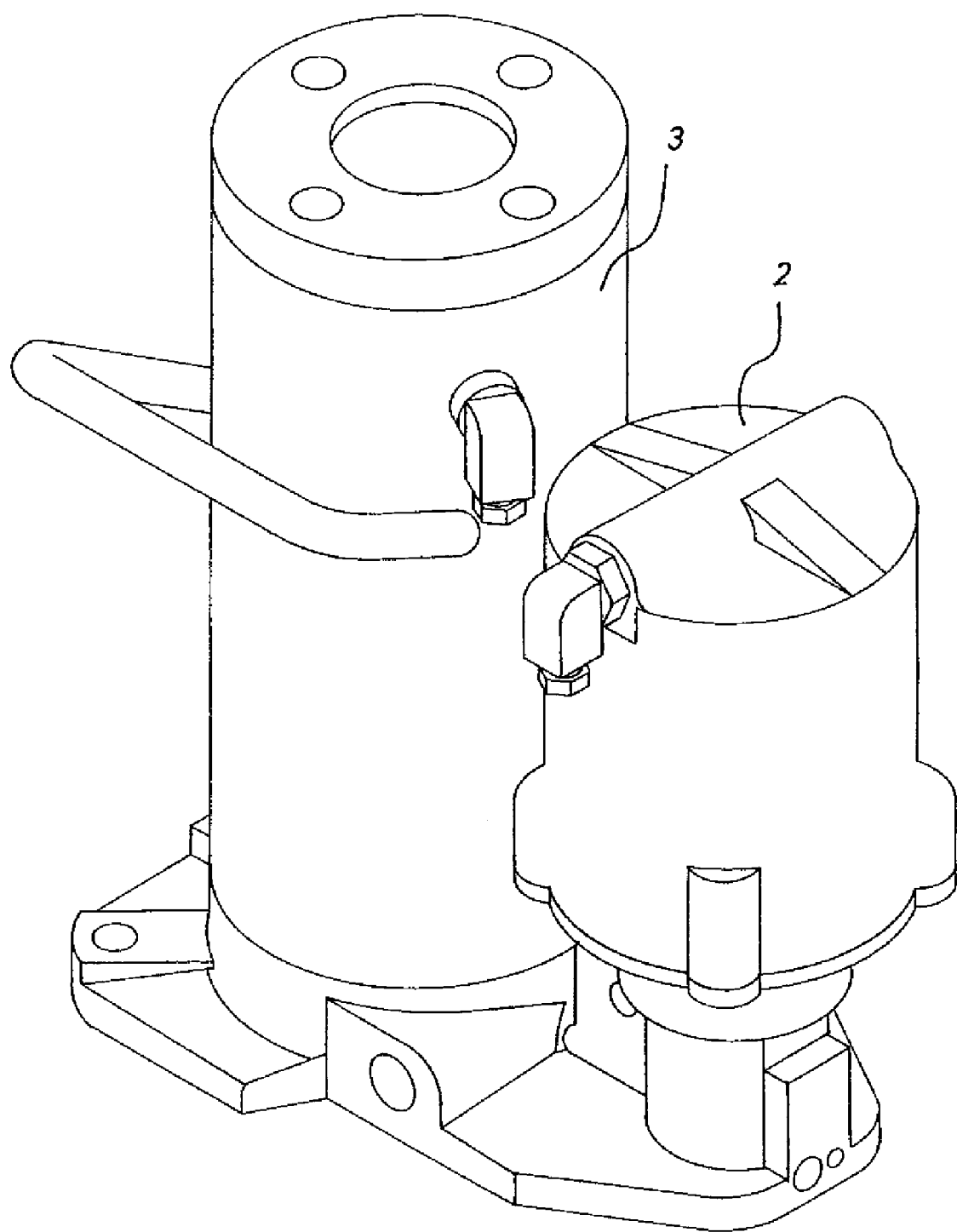
FIG. 1 is a perspective diagram of a jack according to the present invention.
Figure 2:
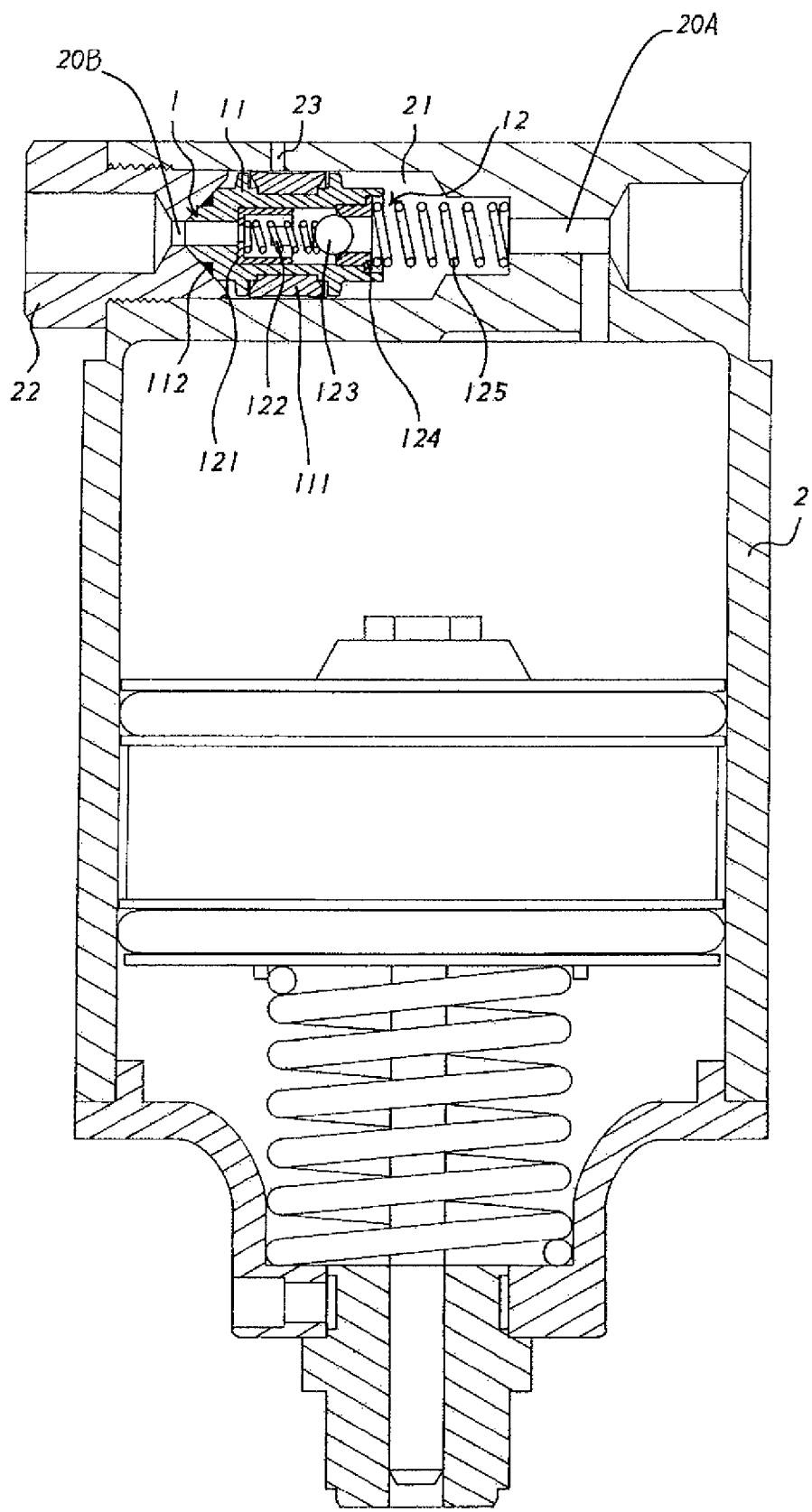
FIG. 2 is a cross sectional diagram of a pump according to the present inventions.

Referring to FIGS. 1 and 2, a check valve 1 for use in a pump of a hydraulic cylinder in accordance with the present invention includes a tubular member 11 disposed therein and having a sheath member 12 received therein. The pump 2 including a chamber 21, in communication with an output pipe 20A, slideably receives the tubular member 11 of the check valve 1 for movement in a movement direction. The chamber 21 has larger cross sections perpendicular to the movement direction than the output pipe 20A.

Figure 3:
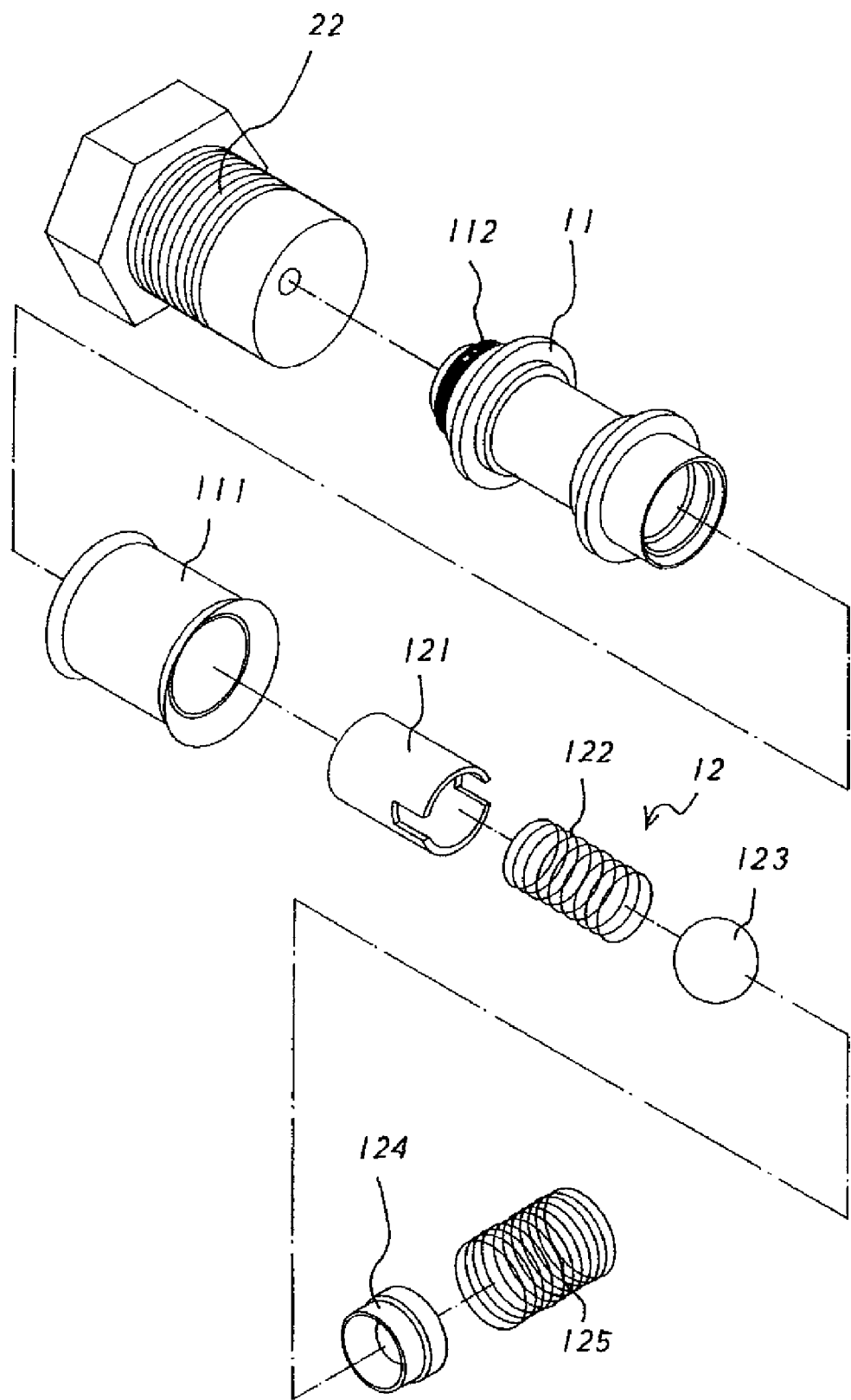
FIG. 3 is a perspective diagram illustrating the exploded components of a check valve for use in a pump of a hydraulic cylinder according to the present invention.
Figure 4:
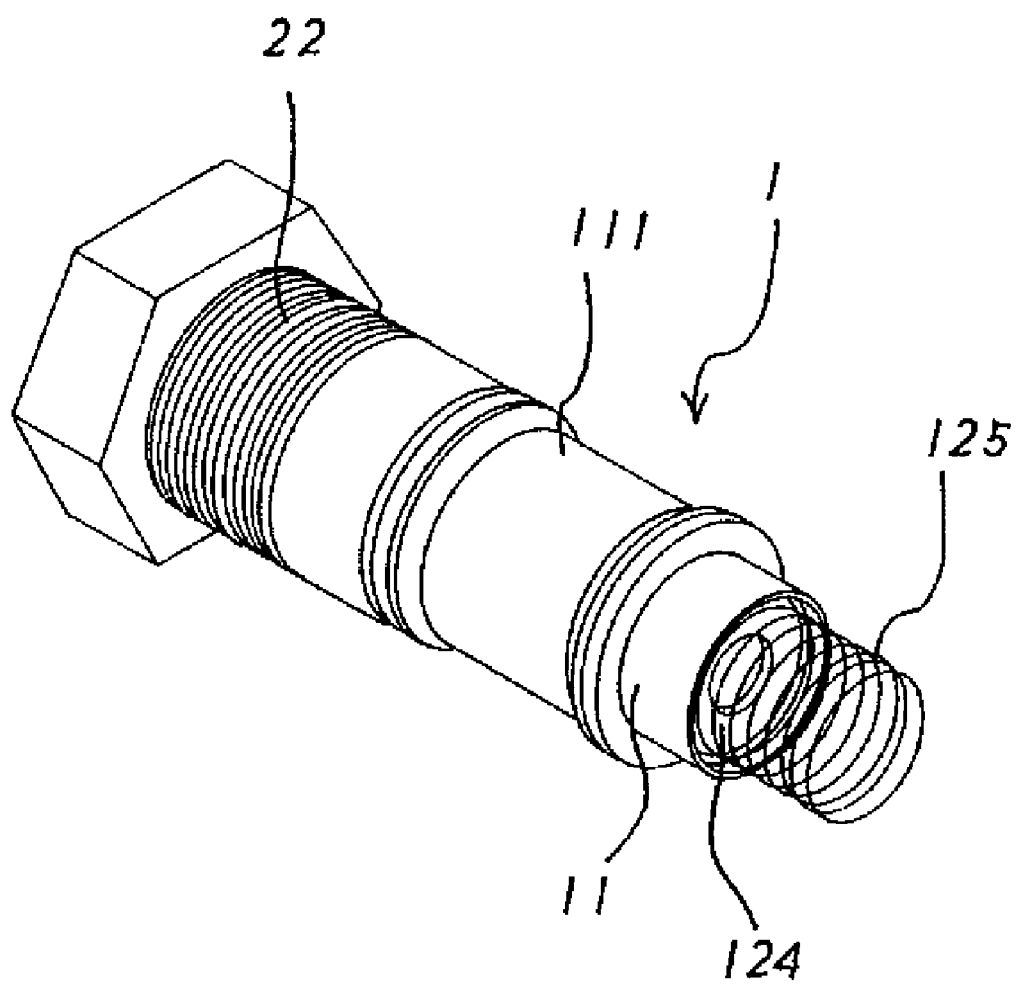
FIG. 4 is a perspective diagram illustrating the assembly of the check valve for use in a pump of a hydraulic cylinder according to the present invention.

The tubular member 11 is constructed in the form of a hollow cylinder and includes a front end 11A and a back end 11B. A first passage 26 extends from the back end 11B towards but spaced from the front end 11A. A second passage 28 extends from the front end 11A and in fluid communication with the first passage 26. The second passage 28 has cross sections smaller than the first passage 26 to define a shoulder 30. The tubular member 11 further includes a sealing sleeve 111 fitted therearound. The tubular member 11 includes an oil seal 112 mounted on the front end 11A thereof for the engagement with a hollow screw element 22 in the chamber 21 (as shown in FIGS. 3 and 4).

The sheath member includes a hollow cap member 121, a first spring element 122, a ball 123, a hollow disc element 124 and a second spring element 125.

Figure 5:
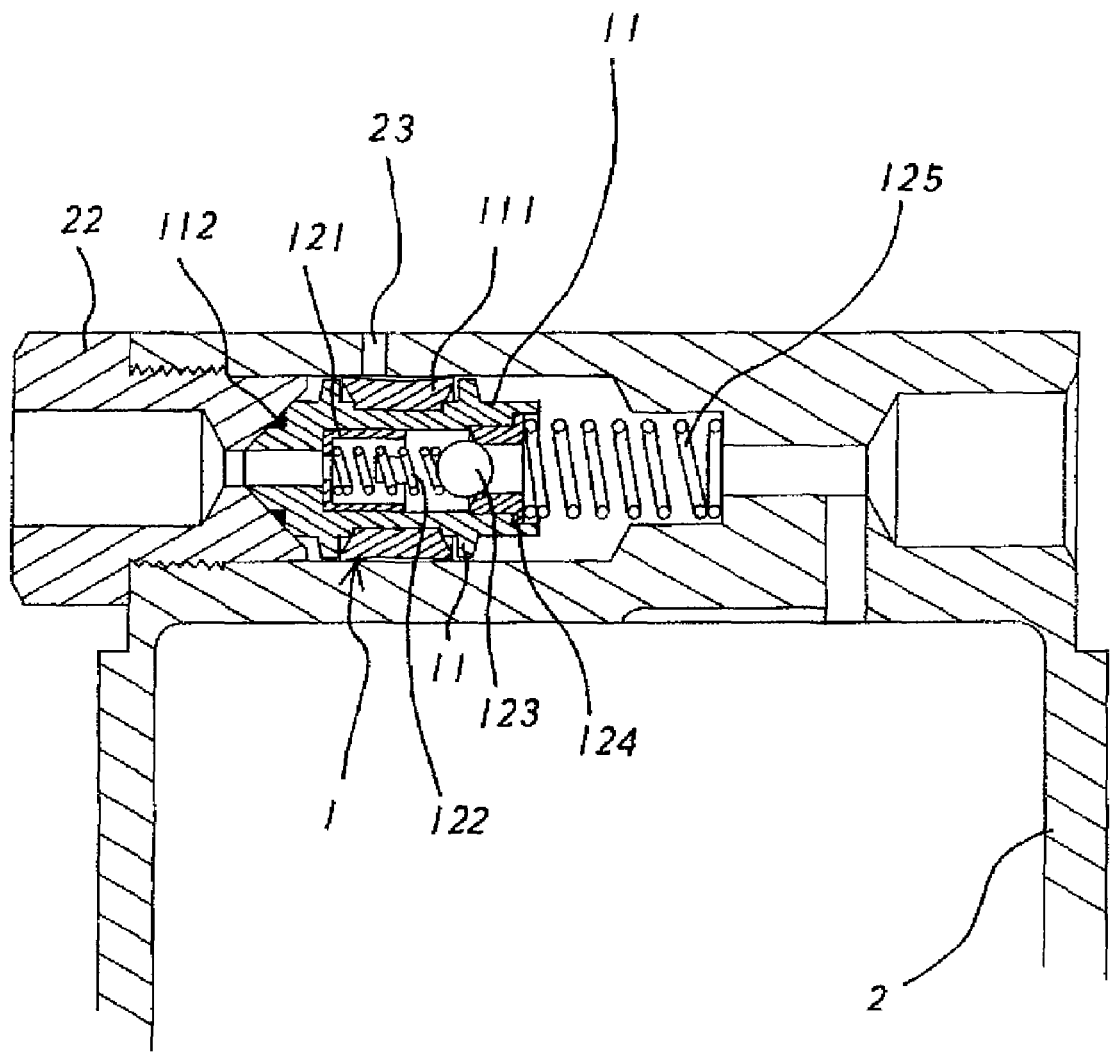
FIG. 5 is a cross sectional diagram illustrating the check valve for use in a pump of a hydraulic cylinder of the present invention being associated with a pump.

In assembly, the hollow cap member 121, the first spring element 122, the ball 123 and the disc element 124 are placed into the tubular member 11 in turn. The first spring element 122 is sandwiched against the cap member 121 and the shoulder 30, and the ball 123 is sandwiched in the first passage 26 between the first spring element 122 and the disc element 124. The second spring element 125 sandwiched between the chamber 21 and the disc element 124 retains the disc element 124, the ball 123 and the first spring element in the first passage 26 of the tubular member 11. By using the disc element 124 and the second spring element 125, the tubular member 11 may be fixed in the chamber 21. Thereafter, by way of the screw element 22 received in the chamber 21 opposite to the output pipe 20A, the tubular member 11 is enclosed in the chamber 21, such that the front end 11A of the tubular member 11 is matingly engaged with the screw element 22 by using the resilience of the second spring element 125 through the disc element 124. The sealing sleeve 111 corresponds to an air opening 23 of the chamber 21, and the ball 123 abuts against the disc element 124 by the first spring element 122 for achieving a checking purpose (as illustrated in FIG. 5). The air opening 23 extends perpendicular to the movement direction and has an axial extent in the movement direction less than the sealing sleeve 11.

Figure 6:
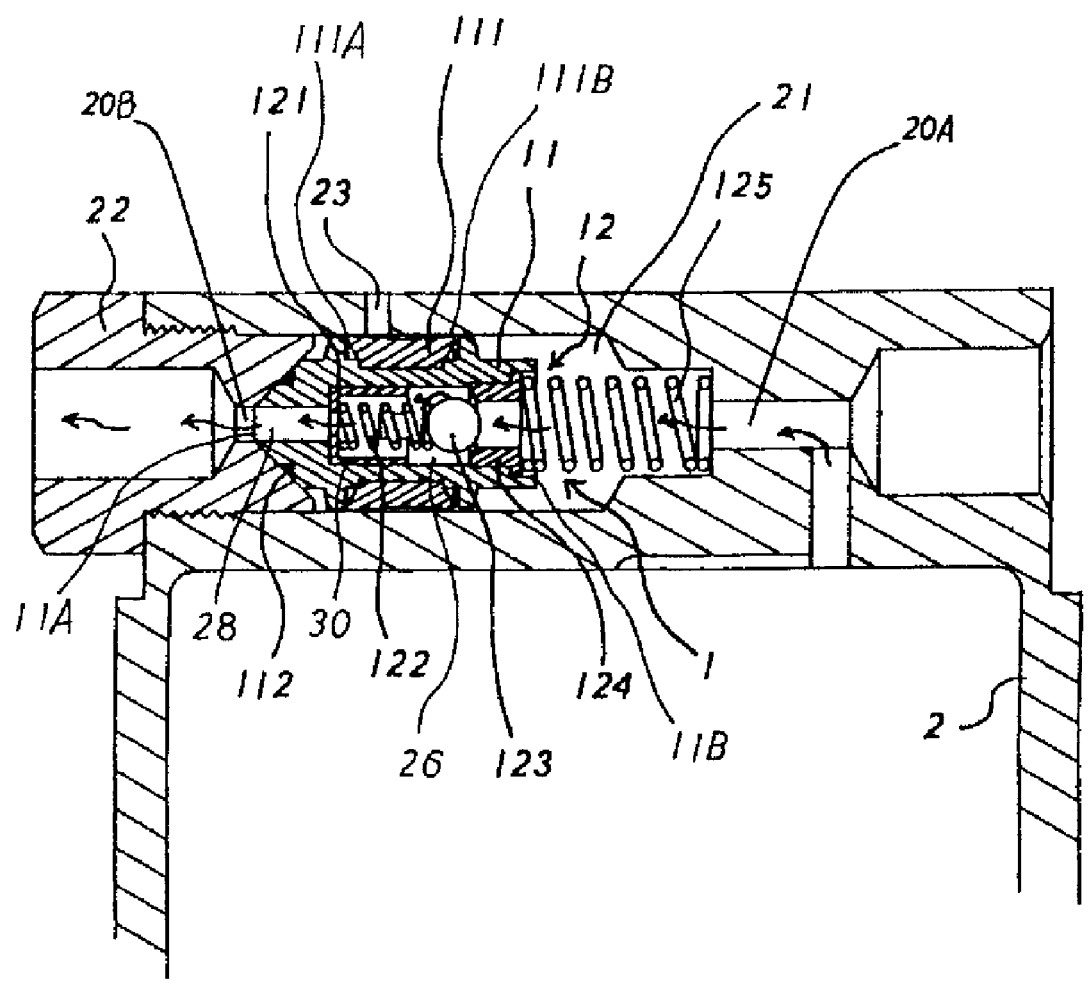
FIG. 6 is a cross sectional diagram illustrating the check valve for use in a pump of a hydraulic cylinder of the present invention outputting air pressure.
Figure 7:
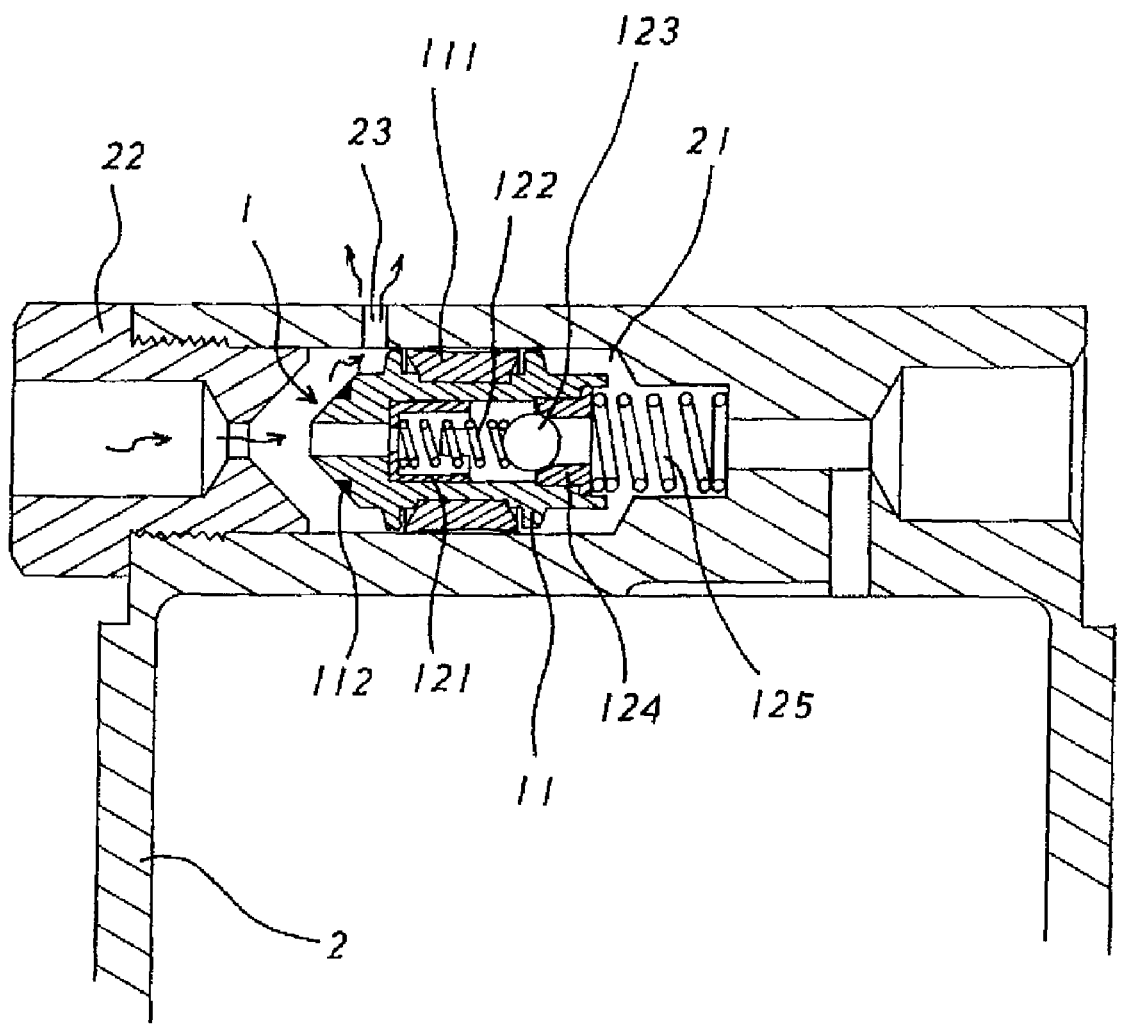
FIG. 7 is a cross sectional diagram illustrating the check valve for use in a pump of a hydraulic cylinder of the present invention venting the air pressure.
Figure 8:
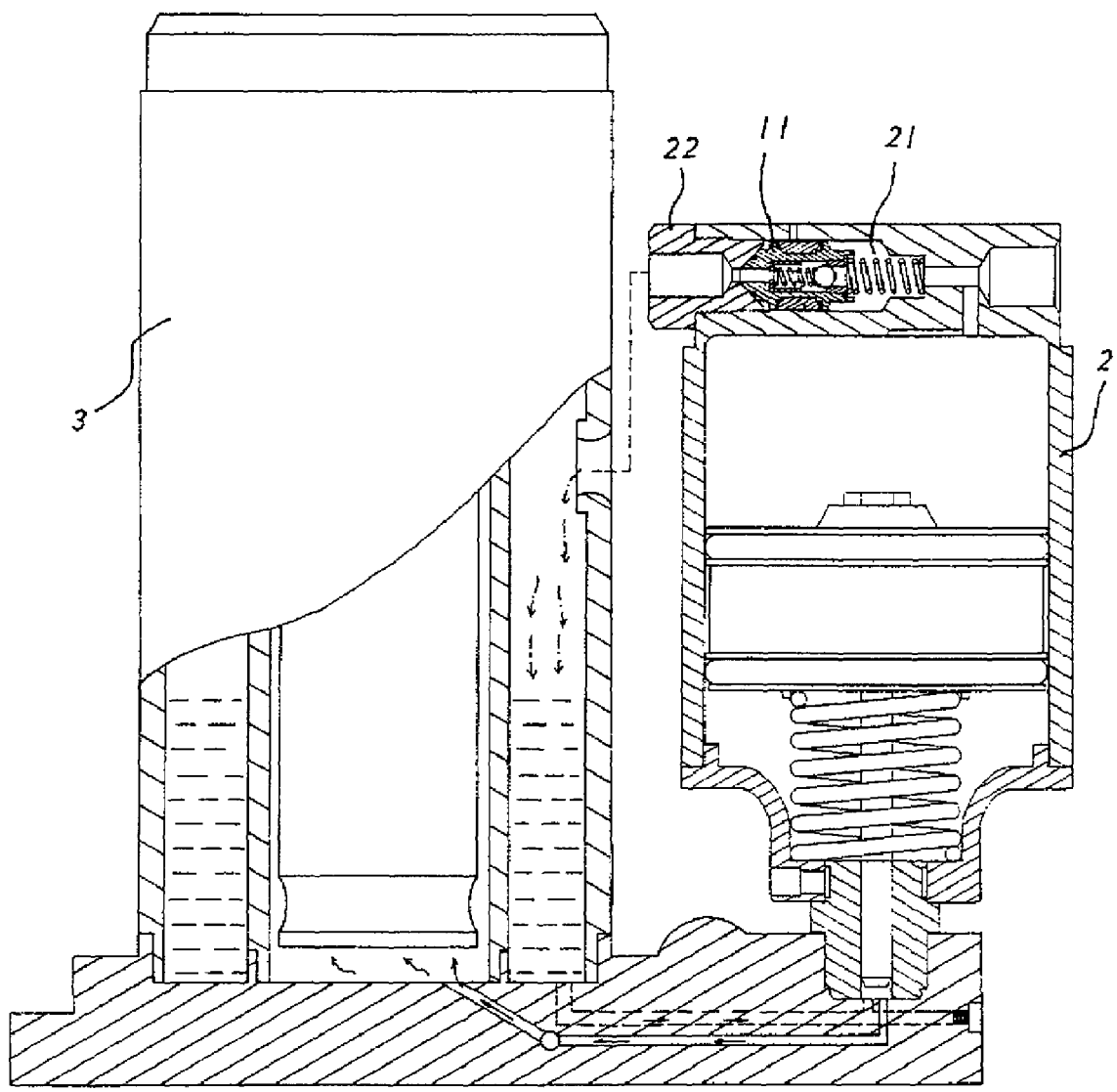
FIG. 8 is a cross sectional diagram illustrating the operation of the pump according to the present invention.

In operation, the pump 2 is compressed by inputted air to actuate a piston so as to generate an internal pressure for being inputted into the chamber 21 through the output pipe 20A. Hence, air pressure may pass through the disc element 124 to push the ball 123 away (as shown in FIG. 6, the air pressure is greater than the resilience of the first spring element 122). Thereafter, the air pressure may further pass through the cap member 121 and the tubular member 11 to lead into the tank of the cylinder 3 for auxiliary pressure by using the pipe 20B, such that the jack lifts an object (as illustrated in FIG. 8). On the contrary, if desiring to lower the object, the pressure in the jack is released, and the air release switch of the jack is turned on for returning air back to the chamber 21. Since the air pressure is pressed with respect to the front end of the tubular member 11 (as illustrated in FIG. 7), and the ball 123 and the disc member 124 in the tubular member 11 form a checking effect, the air pressure pushes the tubular member 11 to move, pressing against the second spring element 125. The tubular member 11 disengages from the air opening 23, and air pressure vents from the air opening 23 for a quick pressure releasing purpose. Thereafter, the second spring element 125 biases the tubular member 11 to return to the initial position, such that the air opening 23 may be sealed once more, thereby preventing the hydraulic oil from leakage during the accelerated operation of the jack.

Furthermore, the sealing sleeve 111 may include integrally formed and radially enlarged bulges 111A and 111E spaced in the movement direction and arranged at two ends thereof for providing a preferred engagement in response to the chamber 21. The air opening 23 is located intermediate the radially enlarged bulges 111A and 111B when the tubular member 11 abuts with the hollow screw element 22.

Figure 9:
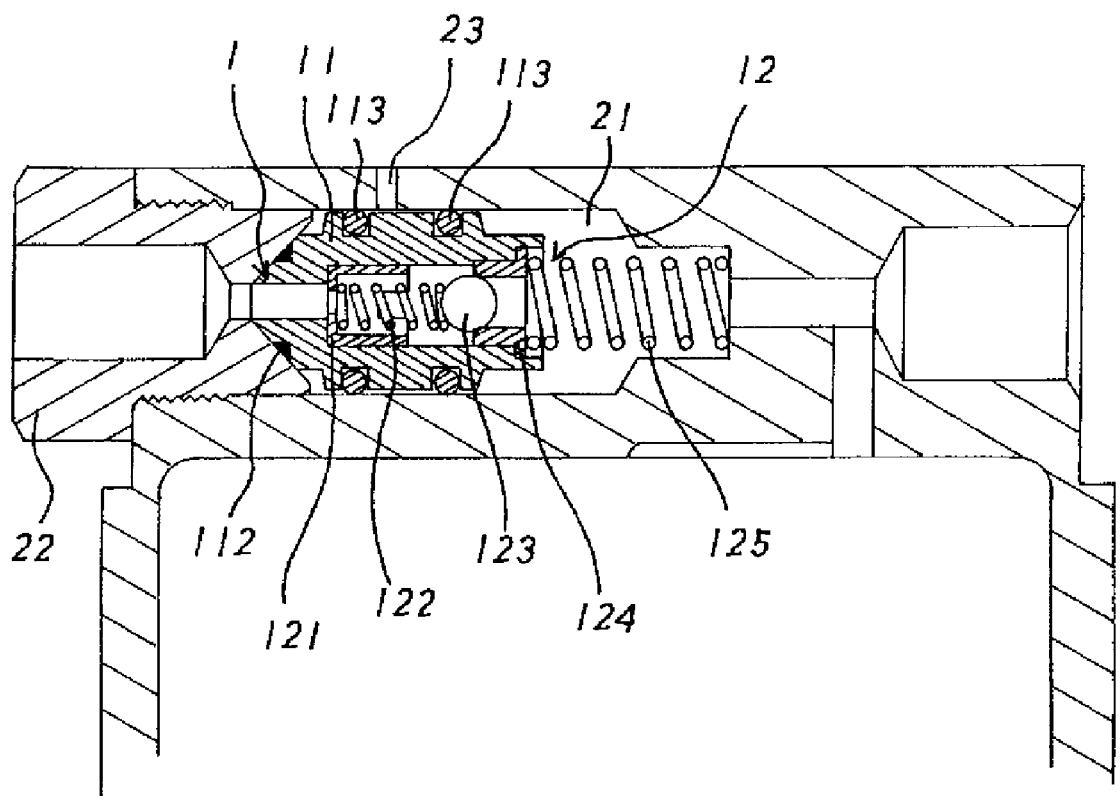
FIG. 9 is a cross sectional diagram illustrating a tubular member of the present invention being provided with one or more ring elements.

Likewise, the tubular member 11 may include one or more ring elements 113 directly disposed on the exterior thereof for obtaining the sealing purpose relative to the chamber 21 (as shown in FIG. 9). Thus, the sealing sleeve 111 may be replaced by the ring element 113, thus saving the production cost.

The invention is not limited to the above embodiment but various modifications thereof may be made. It will be understood by those skilled in the art that various changes in form and detail may be made without departing from the scope and spirit of the present invention.

What is claimed is:

1. A check valve for use in a pump of a hydraulic cylinder comprising:

a tubular member;

a sheath member including a first spring element, a ball, a hollow disc element and a second spring element;

a chamber in communication with an output pipe, with the chamber slideably receiving said tubular member and said sheath member for movement in a movement direction, with the chamber having larger cross sections perpendicular to the movement direction than the output pipe, with the chamber including an air opening extending perpendicular to the movement direction and having an extent in the movement direction;

a hollow screw element received in the chamber opposite to the output pipe;

wherein said tubular member is a hollow cylinder and includes a sealing sleeve fitted therearound, with the sealing sleeve having an extent in the movement direction larger than the extent of the air opening, with the tubular member including a front end and a back end, with the tubular member including a first passage extending from the back end towards but spaced from the front end and a second passage extending from the front end and in fluid communication with the first passage, with the second passage having cross sections perpendicular to the movement direction smaller than the first passage to define a shoulder, with the first spring element sandwiched against the shoulder and the ball sandwiched in the first passage between the first spring element and the disc element, wherein the tubular member includes an oil seal mounted on the front end thereof for engagement with the hollow screw element in said chamber;

wherein said first spring element, said ball and said disc element are of a size which is unable to pass through the second passage and able to pass through the first passage and are placed into said first passage of the tubular member in turn, with said second spring element received in the first passage of the tubular member and being sandwiched between the chamber and the disc element retaining said disc element, said ball, and said first spring spring element in the first passage of the tubular member, with the disc element slideably moveable in the second passage in the movement direction and sandwiched between the ball and the second spring element, with said tubular member fixed in said chamber, by said screw element and the second spring element, said tubular member is enclosed in said chamber with the front end of said tubular member matingly engaged with said screw element by said second spring element through said disc element, said sealing sleeve corresponds to the air opening of said chamber, and said ball abuts against said disc element by said first spring element for achieving a checking purpose, thereby an air pressure generated pushes said ball away and after the generated air pressure is released, said tubular member is pushed to press against said second spring element such that said tubular member disengages from said air opening and air pressure vents from said air opening for a quick pressure releasing purpose, and thereafter, said second spring element biases said tubular member to return such that said air opening is sealed once more, thereby preventing hydraulic oil from leakage during accelerated operation.

2. The check valve for use in a pump of a hydraulic cylinder as claimed in claim 1, wherein the sheath member includes a hollow cap member, with the hollow cap member, the first spring element, the ball and the disc element retained in the tubular member by the second spring element sandwiched between the chamber and the disc element.

3. The check valve for use in a pump of a hydraulic cylinder as claimed in claim 2, wherein said sealing sleeve includes first and second, integrally formed and radially enlarged bulges spaced in the movement direction and arranged at two ends thereof, with the first and second bulges engaging with said chamber, with the sealing sleeve spaced from the chamber intermediate the first and second bulges, with the air opening located intermediate the radially enlarged bulges when the tubular member abuts with the hollow screw element.

* * * * *